(12) United States Patent
Watanabe et al.

(10) Patent No.: US 11,570,326 B2
(45) Date of Patent: Jan. 31, 2023

(54) READING DEVICE AND OUTPUT APPARATUS

(71) Applicant: FUJIFILM Business Innovation Corp., Tokyo (JP)

(72) Inventors: Hiroshi Watanabe, Kanagawa (JP); Yoji Nishida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 4 days.

(21) Appl. No.: 17/063,713

(22) Filed: Oct. 5, 2020

(65) Prior Publication Data
US 2021/0306507 A1    Sep. 30, 2021

(30) Foreign Application Priority Data

Mar. 27, 2020 (JP) .............................. JP2020-058936

(51) Int. Cl.
| | |
|---|---|
| *H04N 1/04* | (2006.01) |
| *H04N 1/028* | (2006.01) |
| *G02B 26/08* | (2006.01) |
| *G02B 7/182* | (2021.01) |

(52) U.S. Cl.
CPC ....... *H04N 1/02895* (2013.01); *G02B 7/1821* (2013.01); *G02B 26/0816* (2013.01)

(58) Field of Classification Search
CPC .............. H04N 1/02895; G02B 7/1821; G02B 26/0816

USPC .................................................. 358/475, 509
See application file for complete search history.

(56) References Cited

U.S. PATENT DOCUMENTS

| | | | | |
|---|---|---|---|---|
| 2007/0091465 A1* | 4/2007 | Ichikawa | ............... | G02B 26/10 359/726 |
| 2007/0177233 A1* | 8/2007 | Ichikawa | ........... | H04N 1/00822 358/509 |
| 2010/0110505 A1* | 5/2010 | Maruyama | ......... | H04N 1/02815 358/475 |

FOREIGN PATENT DOCUMENTS

JP          2010130444         6/2010

\* cited by examiner

*Primary Examiner* — Cheukfan Lee
(74) *Attorney, Agent, or Firm* — JCIPRNET (57) ABSTRACT

A reading device includes an emission unit that emits light; a first reflecting unit having a first reflecting surface that reflects the light emitted by the emission unit toward a document; an optical path unit including a second reflecting unit having a second reflecting surface that reflects the light reflected by the first reflecting unit and specularly reflected by the document, the optical path unit defining an optical path that guides the light reflected by the second reflecting surface; an image sensor that generates an image represented by light guided by the optical path unit; and a support unit that supports the first reflecting unit and the second reflecting unit and fixes a relative position and a relative orientation between the first reflecting surface and the second reflecting surface.

20 Claims, 8 Drawing Sheets

READING DEVICE AND OUTPUT APPARATUS

CROSS-REFERENCE TO RELATED APPLICATIONS

This application is based on and claims priority under 35 USC 119 from Japanese Patent Application No. 2020-058936 filed Mar. 27, 2020.

BACKGROUND i) Technical Field

The present disclosure relates to a reading device and an output apparatus.

ii) Related Art

Japanese Unexamined Patent Application Publication No. 2010-130444 describes a reading device including a second emission unit that emits light for receiving a portion of a specularly reflected light component from a document. The light emitted from the second emission unit is incident on the document at an angle that is not 0 degrees with respect to a reflection angle of a principal ray of specularly reflected light guided toward a light guiding unit.

SUMMARY

A reading device that creates an image based on an image read by an image sensor may include a reflecting unit that reflects light toward a reading region and a light guiding unit that guides light reflected by the reading region. In such a case, even a slight displacement between the reflecting unit and the light guiding unit may easily result in insufficient amount of light reaching the image sensor.

Aspects of non-limiting embodiments of the present disclosure relate to facilitation of positioning of reflecting units that reflect light before and after the light reaches a reading region.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a reading device including an emission unit that emits light; a first reflecting unit having a first reflecting surface that reflects the light emitted by the emission unit toward a document; an optical path unit including a second reflecting unit having a second reflecting surface that reflects the light reflected by the first reflecting unit and specularly reflected by the document, the optical path unit defining an optical path that guides the light reflected by the second reflecting surface; an image sensor that generates an image represented by light guided by the optical path unit; and a support unit that supports the first reflecting unit and the second reflecting unit and fixes a relative position and a relative orientation between the first reflecting surface and the second reflecting surface.

BRIEF DESCRIPTION OF THE DRAWINGS

An exemplary embodiment of the present disclosure will be described in detail based on the following figures, wherein.

DETAILED DESCRIPTION

1. Exemplary Embodiment

Figure 1:
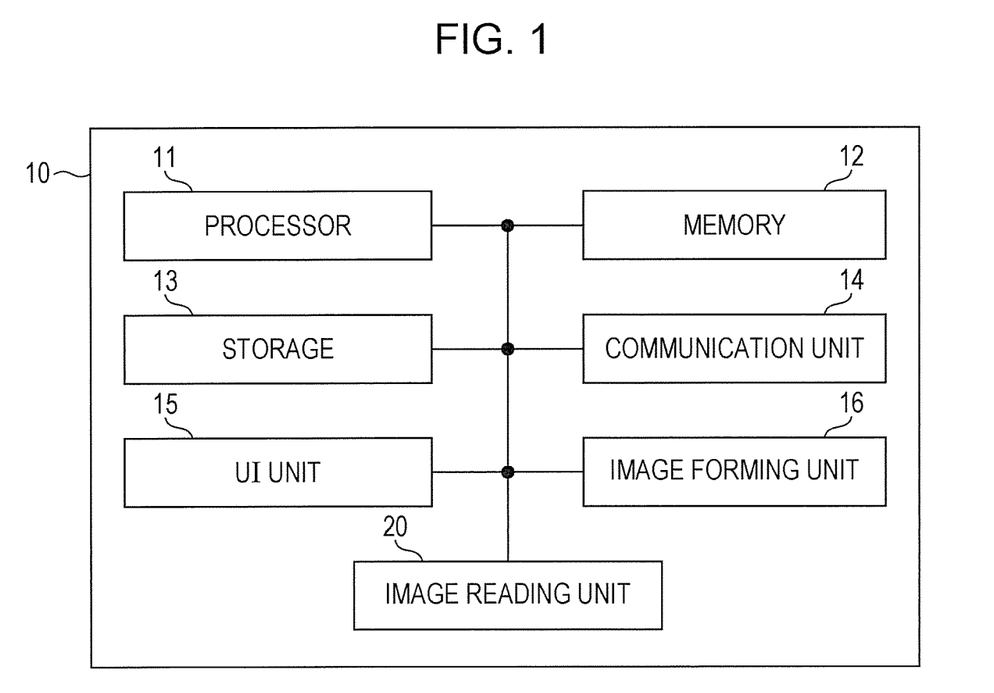
FIG. 1 illustrates a hardware structure of an image reading device according to an exemplary embodiment.

FIG. 1 illustrates a hardware structure of an image reading device 10 according to an exemplary embodiment. The image reading device 10 is a device that reads an image on a document. The image reading device 10 is an example of a "reading device" according to the present disclosure. The image reading device 10 is a computer including a processor 11, a memory 12, a storage 13, a communication unit 14, a user interface (UI) unit 15, an image forming unit 16, and an image reading unit 20.

The processor 11 includes, for example, a computing device such as a central processing unit (CPU), a register, and peripheral circuits. The memory 12 is a recording medium from which data may be read by the processor 11, and includes a random access memory (RAM) and a read only memory (ROM). The storage 13 is a recording medium from which data may be read by the processor 11, and includes, for example, a hard disk drive or a flash memory.

The processor 11 controls operations of hardware devices by executing programs stored in the ROM or the storage 13 using the RAM as a work area. The communication unit 14 includes an antenna and a communication circuit, and provides communication through communication lines (not shown). The programs executed by the processor 11 may be obtained from an external device that communicates with the processor 11 through the communication unit 14.

The UI unit 15 is an interface provided to a user who uses the device (image reading device 10). The interface is a device that receives information input by the user and outputs information provided by the image reading device 10. The UI unit 15 includes, for example, a touch screen including a display that serves as display means and a touch panel provided on a surface of the display. The UI unit 15 displays an image and is operated by the user.

The image forming unit 16 forms an image on a medium, such as a paper sheet. In the present exemplary embodiment, the image forming unit 16 forms an image on a medium by the inkjet method. The method for forming an image is not limited to this, and an electrophotographic system, for example, may instead be employed.

The image reading unit 20 includes a light source, an optical system, and an image sensor, and reads an image on a document by causing light from the light source to be reflected by the document. The image reading unit 20 supplies document image data representing the image on the document that has been read to the processor 11. The processor 11 performs various processes (print process, facsimile transmission process, etc.) by using the supplied document image data.

Figure 2:
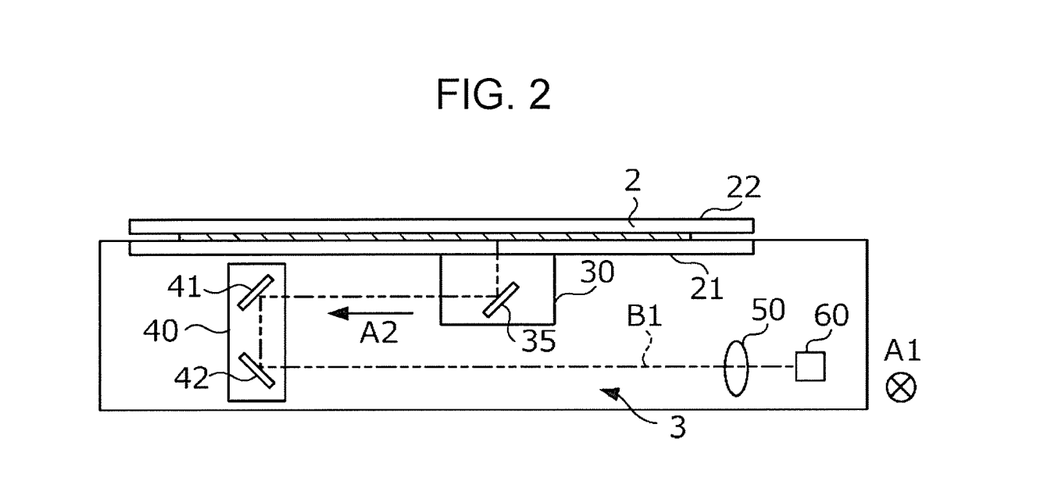
FIG. 2 illustrates the detailed structure of an image reading unit.

FIG. 2 illustrates the detailed structure of the image reading unit 20. FIG. 2 illustrates the image reading unit 20 viewed in a main scanning direction A1. The main scanning direction A1 is a direction from the near side to the far side of FIG. 2. The image reading unit 20 includes a document table 21, a document covering part 22, a carriage 30, a carriage 40, an imaging lens 50, and an image sensor 60. The illustrated structure of the image reading unit 20 has a predetermined width in the main scanning direction A1. The carriage 30, the carriage 40, the imaging lens 50, and the image sensor 60 each have an elongated shape that extends in the main scanning direction A1. In FIG. 2, the direction shown by the arrow denoted by "A2" is a sub-scanning direction A2. The image reading unit 20 is a reading device having a so-called reduction optical system.

The document table 21 is a transparent glass plate that supports a document 2, on which an image to be read is formed. The document table 21 may instaed be, for example, an acrylic plate as long as the document table 21 is a transparent plate-shaped member. The document covering part 22 covers the document table 21 to block external light, and the document 2 is placed between the document covering part 22 and the document table 21. The document 2 is supported in a stationary manner by the document table 21 and the document covering part 22.

When the document 2 is being read, the carriage 30 moves in the sub-scanning direction A2 at a predetermined speed. The carriage 30 includes emission units that emit light toward the document 2. The emission units will be described in detail below with reference to FIG. 3. The carriage 30 has a mirror 35 therein. The mirror 35 reflects light reflected by the document 2 to guide the light to an optical path B1 that extends to the image sensor 60.

When the document 2 is being read, the carriage 40 is moved in the sub-scanning direction A2 at a speed that is half the speed of the carriage 30. The carriage 40 has a mirror 41 and a mirror 42 therein. The mirrors 41 and 42 reflect the light reflected by the mirror 35 to guide the light to the optical path B1. The imaging lens 50 focuses the light reflected by the mirror 42 on a predetermined position.

The image sensor 60 includes a light receiving element, such as a charge coupled device (CCD). The image sensor 60 receives light focused by the imaging lens 50 and generates an image signal corresponding to the received light. The image sensor 60 supplies the generated image signal to the processor 11 illustrated in FIG. 1. The processor 11 generates image data of the document 2 based on the supplied image signal.

Figure 3:
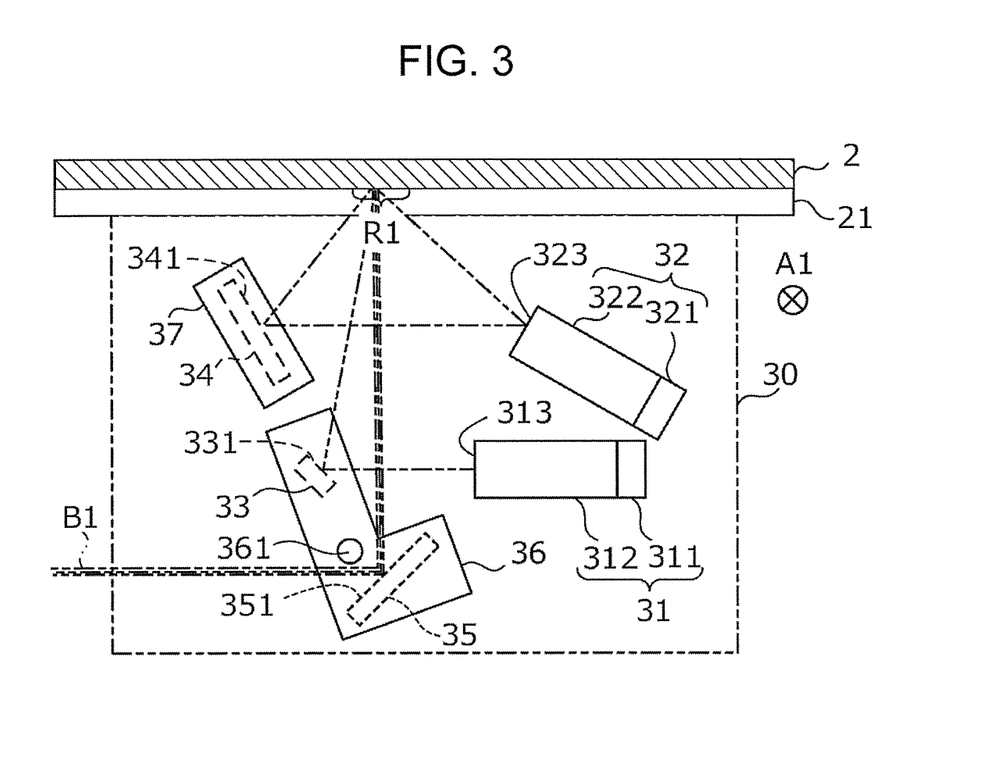
FIG. 3 is an enlarged view of a carriage.

FIG. 3 is an enlarged view of the carriage 30. The carriage 30 includes a light emission unit 31, a light emission unit 32, a reflector 33, a reflector 34, the mirror 35, a first support member 36, and second support members 37.

The light emission unit 31 emits light to be specularly reflected by the document 2. The light emission unit 31 has an emission surface 313 from which light is emitted, and emits the light to be specularly reflected by the document 2 from the emission surface 313. The light emission unit 32 emits light to be diffusely reflected by the document 2. The light emission unit 32 has an emission surface 323 from which light is emitted, and emits the light to be diffusely reflected by the document 2 from the emission surface 323. The light emission unit 31 is an example of an "emission unit" according to the present disclosure, and the light emission unit 32 is an example of a "second emission unit" according to the present disclosure.

The light emission unit 31 includes a light source 311 and a light guide 312. The light source 311 includes, for example, light emitting diodes (LEDs) that emit light. The light guide 312 is a transparent member that transmits light therethrough. The light guide 312 has the above-described emission surface 313, and guides the light from the light source 311 to the emission surface 313. The emission surface 313 is generally flat, but has fine irregularities so that diffused light is emitted.

The light emission unit 32 includes a light source 321 and a light guide 322. The light source 321 includes, for example, LEDs that emit light. The light guide 322 is a transparent member that transmits light therethrough. The light guide 322 has the above-described emission surface 323, and guides the light from the light source 321 to the emission surface 323. The emission surface 323 is generally flat, but has fine irregularities so that diffused light is emitted. In this exemplary embodiment, the LEDs are arranged in a long-side direction.

As illustrated in FIG. 3, part of the light emitted from the emission surface 313 reaches the reflector 33.

Figure 4:
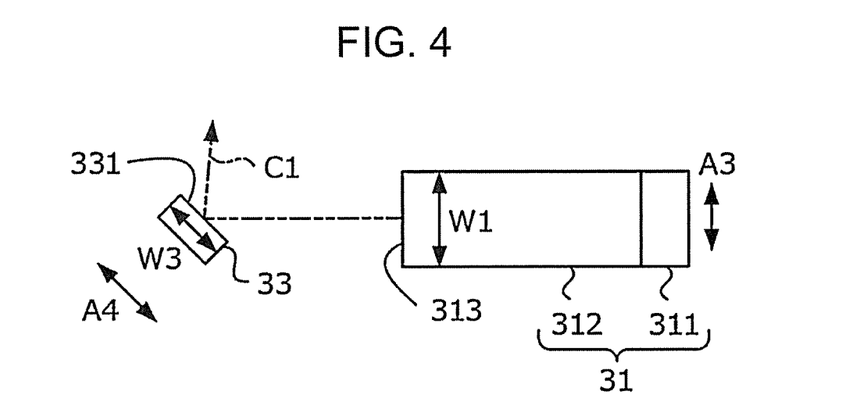
FIG. 4 is an enlarged view of a region including a reflector.

FIG. 4 is an enlarged view of a region including the reflector 33. The reflector 33 is a member having a reflecting surface 331 that reflects the light from the emission surface 313 toward a reading region R1 of the document 2 so that light to be specularly reflected (light to be specularly reflected by the document 2) is emitted toward the reading region R1. The reflector 33 is an example of a "first reflecting unit" according to the present disclosure, and the reflecting surface 331 is an example of a "first reflecting surface" according to the present disclosure. In the present exemplary embodiment, the reflecting surface 331 is a flat surface.

Figure 5:
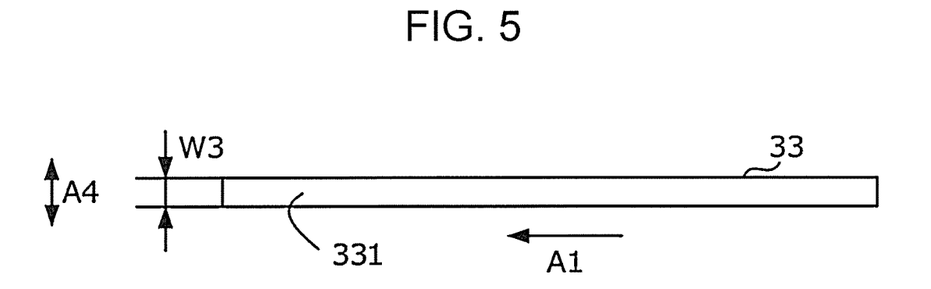
FIG. 5 is a front view of a reflecting surface.

FIG. 5 is a front view of the reflecting surface 331. As illustrated in FIG. 5, similar to the emission surface 313 of the light guide 312, the reflecting surface 331 of the reflector 33 has a long-side direction that is the main scanning direction A1 and is rectangular in front view. The size of the reflecting surface 331 is such that the dimension in a short-side direction A4 is dimension W3. The short-side direction A4 is a direction that is orthogonal to the long-side direction of the reflecting surface 331, which is the main scanning direction A1, and extends along the reflecting surface 331.

As illustrated in FIG. 3, part of the light emitted from the emission surface 323 of the light guide 322 reaches the reflector 34.

Figure 6:
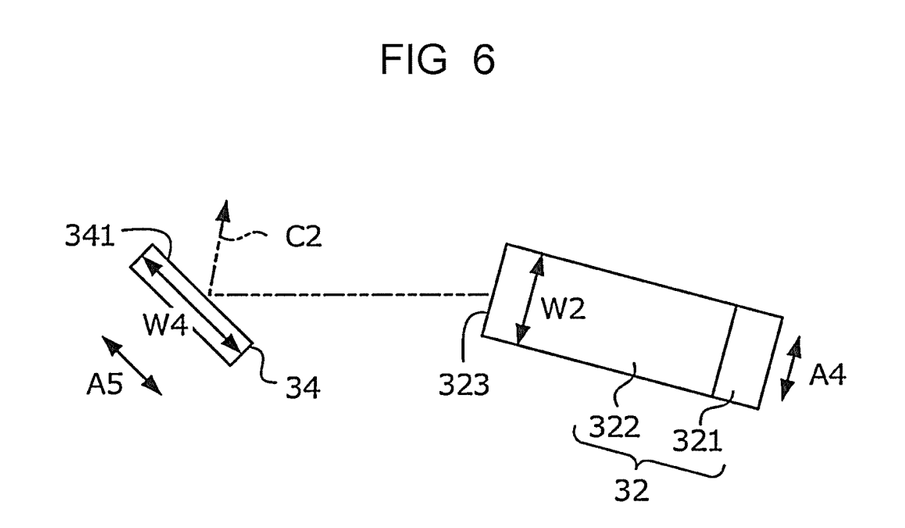
FIG. 6 is an enlarged view of a region including a reflector.

FIG. 6 is an enlarged view of a region including the reflector 34. The reflector 34 is a member having a reflecting surface 341 that reflects the light from the emission surface 323 toward the reading region R1 of the document 2 so that light to be diffusely reflected (light to be diffusely reflected by the document 2) is emitted toward the reading region R1.

Figure 7:
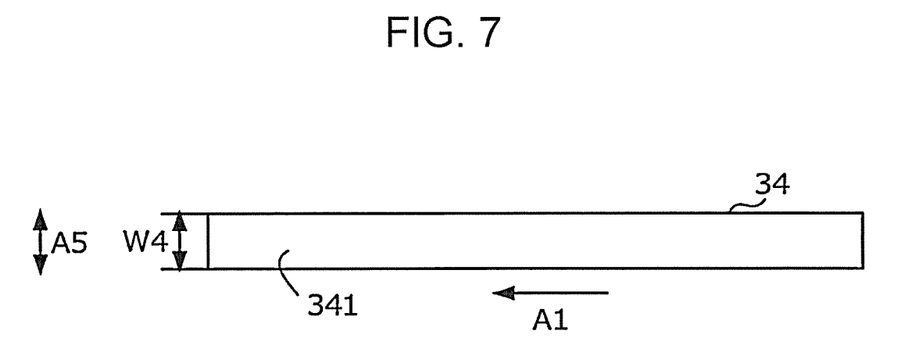
FIG. 7 is a front view of a reflecting surface.

FIG. 7 is a front view of the reflecting surface 341. As illustrated in FIG. 7, similar to the emission surface 323 of the light guide 322, the reflecting surface 341 of the reflector 34 has a long-side direction that is the main scanning direction A1 and is rectangular in front view. The size of the reflecting surface 341 is such that the dimension in a short-side direction A5 is dimension W4. The short-side direction A5 is a direction that is orthogonal to the long-side direction of the reflecting surface 341, which is the main scanning direction A1, and extends along the reflecting surface 341.

When the light reflected by the reflecting surface 331 reaches the reading region R1 of the document 2, part of the light is specularly reflected by the document 2. The light that has been specularly reflected by the document 2 reaches the mirror 35 illustrated in FIG. 2. The mirror 35 has a reflecting surface 351 that reflects the light that has been reflected by the reflector 33 and specularly reflected by the document 2. The mirror 35 is an example of a "second reflecting unit" according to the present disclosure, and the reflecting surface 351 is an example of a "second reflecting surface" according to the present disclosure.

Figure 8:
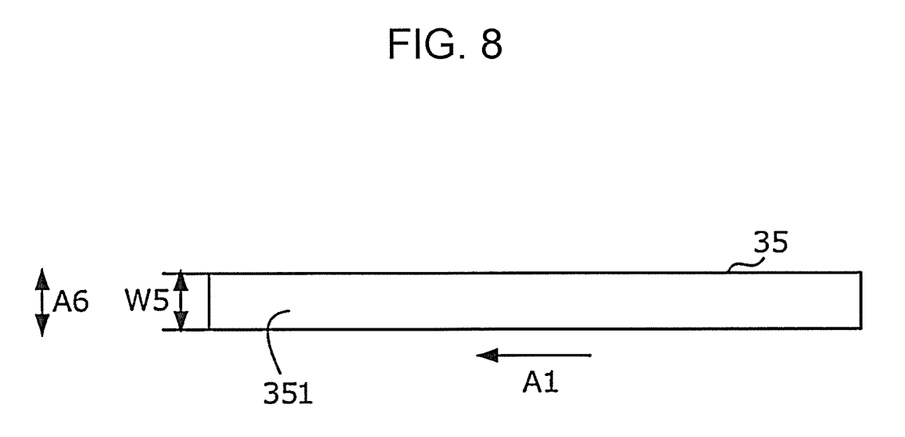
FIG. 8 is a front view of a reflecting surface.

FIG. 8 is a front view of the reflecting surface 351. As illustrated in FIG. 8, the reflecting surface 351 of the mirror 35 has a long-side direction that is the main scanning direction A1 and is rectangular in front view. The size of the reflecting surface 351 is such that the dimension in a short-side direction A6 is dimension W5. The short-side direction A6 is a direction that is orthogonal to the long-side direction of the reflecting surface 351, which is the main scanning direction A1, and extends along the reflecting surface 351.

The dimension W5 is greater than the dimension W3 of the reflecting surface 331 of the reflector 33 in the short-side direction A4. Since the dimension W5 is greater than the dimension W3, even when the optical path B1 for the light reflected by the document 2 is displaced due to, for example, allowable differences, the reflected light is more easily reflected by the reflecting surface 351 compared to when the dimension W5 is less than the dimension W3.

As illustrated in FIG. 3, the mirror 35 is disposed closer to the reflector 33 for the light to be specularly reflected than to the reflector 34 for the light to be diffusely reflected. Accordingly, compared to when the mirror 35 is disposed closer to the reflector 34 for the light to be diffusely reflected than to the reflector 33 for the light to be specularly reflected, the reflector 33 and the mirror 35 may be more accurately positioned relative to each other. In addition, the size of the first support member 36 may be reduced, so that the component cost may be reduced.

The light reflected by the mirror 35 is guided by the mirror 41, the mirror 42, and the imaging lens 50 illustrated in FIG. 2 and reaches the image sensor 60. The mirror 35, the mirror 41, the mirror 42, and the imaging lens 50 function as an optical path unit 3 that defines the optical path B1 illustrated in FIG. 2 along which the light reflected by the reflecting surface 351 of the mirror 35 is guided. The image sensor 60 generates an image represented by the light guided by the optical path unit 3.

Part of the light emitted by the light emission unit 32 is diffusely reflect by the document 2 so that the reflected light represents an image. Part of the light emitted from the emission surface 323 of the light guide 322 included in the light emission unit 32 travels toward the reflector 34. The reflecting surface 341 of the reflector 34 reflects the light emitted by the light emission unit 32 toward the reading region R1 of the document 2. The reflector 34 is an example of a "third reflecting unit" according to the present disclosure, and the reflecting surface 341 is an example of a "third reflecting surface" according to the present disclosure.

The reflector 34 is positioned so that when the light that has been reflected by the reflecting surface 341 reaches the document 2, part of the light that is specularly reflected by the document 2 does not travel toward the optical path B1. Therefore, when the light that has been reflected by the reflecting surface 341 reaches the document 2, a portion of part of the light that is diffusely reflected by the document 2 travels toward the optical path B1, as illustrated in FIG. 3. The light that travels toward the optical path B1 as described above is guided along the optical path B1 illustrated in FIG. 2 by the optical path unit 3, and reaches the image sensor 60.

As described above, the light emission unit 32 is disposed so that the light emitted therefrom and diffusely reflected by the document 2 is guided to the image sensor 60 by the optical path unit 3. Thus, in the present exemplary embodiment, both the specularly reflected light and the diffusely reflected light are guided to the image sensor 60 by the optical path unit 3. Accordingly, the device (image reading device 10) may have a smaller size than when the specularly reflected light and the diffusely reflected light are guided by different optical path units. The image sensor 60 generates an image represented by the received light, that is, the light that has been diffusely reflected by the document 2. Thus, the image sensor 60 generates images based on both the light that is specularly reflected by the reading region R1 and the light that is diffusely reflected by the reading region R1.

Part of the light emitted from the emission surface 323 of the light guide 322 directly travels toward the reading region R1 of the document 2, and is diffusely reflected. Part of the diffusely reflected light travels toward the optical path B1. Thus, the light emission unit 32 emits light toward both the reflector 34 and the reading region R1. The image sensor 60 also generates an image based on the light that has directly reached the reading region R1 and been diffusely reflected after being emitted by the light emission unit 32.

In the present exemplary embodiment, the light that travels from the reading region R1 toward the mirror 35 is directed vertically downward. In this case, even when the document placed on the document table is partially raised from the document table, the effect of whether the document is raised or not on the quality of the read image is reduced.

The first support member 36 is a member that supports the reflector 33 and the mirror 35 and fixes the relative position and orientation between the reflecting surface 331 and the reflecting surface 351. The first support member 36 is an example of a "support unit" according to the present disclosure.

Figure 9A:
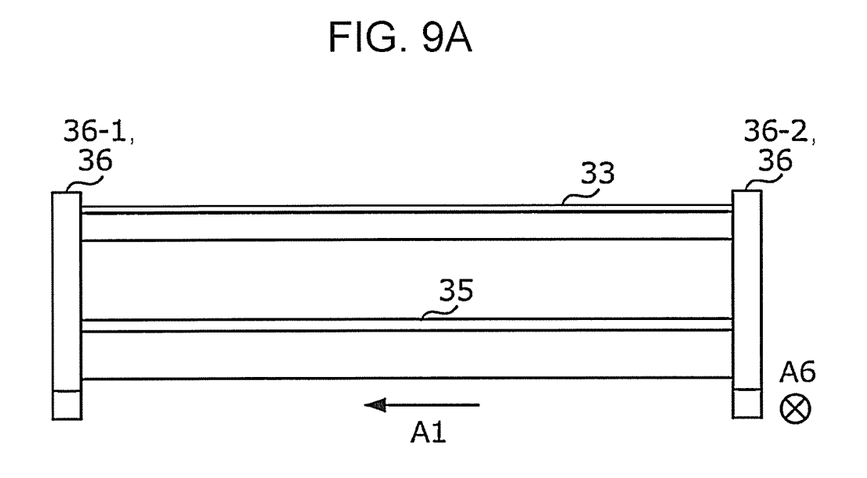
FIGS. 9A to 9C illustrate an example of a first support member.
Figure 9B:
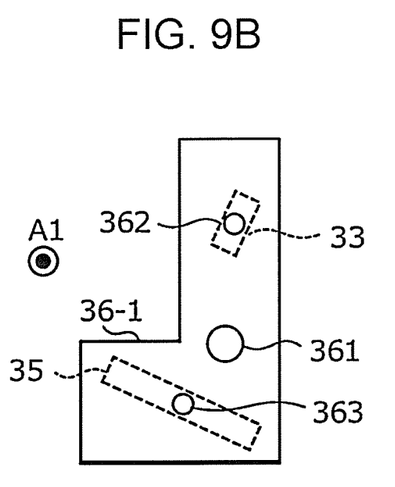
Figure 9C:
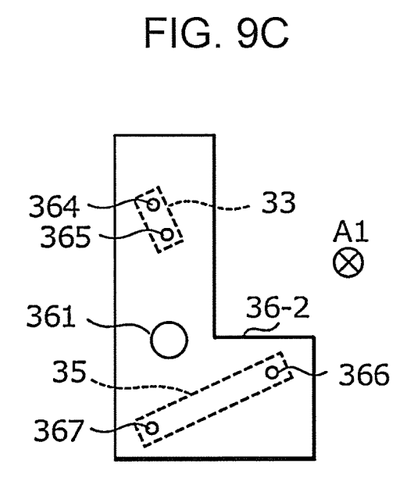

FIGS. 9A to 9C illustrate an example of the first support member 36. FIG. 9A illustrates the first support member 36, the reflector 33, and the mirror 35 viewed in the short-side direction A6 of the mirror 35.

The first support member 36 includes a first member 36-1 that is plate-shaped and provided at the downstream side in the main scanning direction A1 and a second member 36-2 that is plate-shaped and provided at the upstream side in the main scanning direction A1. The downstream ends of the reflector 33 and the mirror 35 in the main scanning direction A1 are fixed to the first member 36-1, and the upstream ends of the reflector 33 and the mirror 35 in the main scanning direction A1 are fixed to the second member 36-2.

FIG. 9B illustrates the first member 36-1 viewed from the downstream side in the main scanning direction A1, and FIG. 9C illustrates the second member 36-2 viewed from the upstream side in the main scanning direction A1. The first member 36-1 includes a first rotating shaft 361, a second rotating shaft 362, and a third rotating shaft 363. The first member 36-1 is rotatably supported by the first rotating shaft 361 in a housing of the device (image reading device 10).

One end of the reflector 33 in the main scanning direction A1 (downstream end in the main scanning direction A1) is rotatably supported by the second rotating shaft 362 of the first member 36-1. One end of the mirror 35 in the main scanning direction A1 (downstream end in the main scanning direction A1) is rotatably supported by the third rotating shaft 363 of the first member 36-1. The second rotating shaft 362 and the third rotating shaft 363 are rotated when, for example, a dedicated jig is attached thereto and operated.

The second member 36-2 includes a fixing member 364, a fixing member 365, a fixing member 366, and a fixing member 367. Each fixing member is, for example, a screw-shaped part that extends through and projects from the second member 36-2 to contact and fix the reflector 33 or the mirror 35 with the projecting portion thereof. The fixing members 364 and 365 fix the upstream end of the reflector 33 in the main scanning direction A1. The fixing members 366 and 367 fix the upstream end of the mirror 35 in the main scanning direction A1.

Thus, the first support member 36 fixes the reflector 33 and the mirror 35 by supporting one end of each of the reflector 33 and the mirror 35 in the main scanning direction A1 (downstream end in the main scanning direction A1) in a rotatable manner and being in contact with the other end of each of the reflector 33 and the mirror 35 (upstream end in the main scanning direction A1). Accordingly, each of the reflector 33 and the mirror 35 is arranged such that the orientation of the reflecting surface thereof is changeable by an operation performed only at one of the ends thereof in the long-side direction that is rotatably supported.

The document is positioned with reference to the upstream end of the document table 21 in the main scanning direction A1. Therefore, image reading is performed for the document of any size at the upstream end of the document table 21 in the main scanning direction A1. In contrast, image reading is not performed at the downstream end of the document table 21 in the main scanning direction A1 when the size of the document is small.

Each of the reflector 33 and the mirror 35 may be more accurately positioned when in contact with and fixed by the first support member 36 at two or more positions than at one position. In the present exemplary embodiment, each of the reflector 33 and the mirror 35 is in contact with and fixed by the first support member 36 at two or more positions at the upstream end in the main scanning direction A1 where image reading is always performed. Therefore, every document receives the benefits of high image reading accuracy.

The second support members 37 are members that support the reflector 34. The second support members 37 are an example of a "second support unit" according to the present disclosure.

Figure 10:
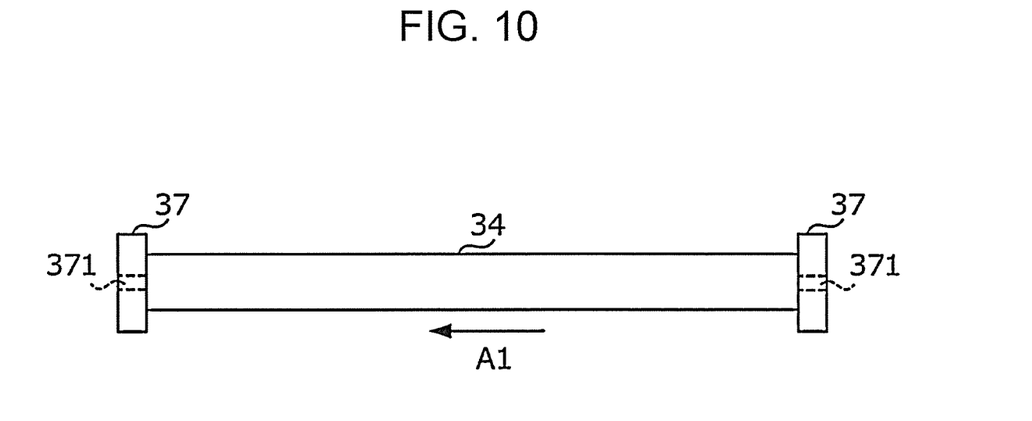
FIG. 10 illustrates an example of second support members.

FIG. 10 illustrates an example of the second support members 37. FIG. 10 illustrates the second support members 37 and the reflector 34. Each second support member 37 includes a rotating shaft 371. The second support members 37 are rotatably supported by the rotating shafts 371 in the housing of the device (image reading device 10). The orientation of the reflector 34 is adjusted by rotating the second support members 37.

The positions at which the rotating shafts 371 are attached to the housing is adjustable. Accordingly, the positional relationship between the reflector 34 and the mirror 35 is adjustable. As described above, the reflector 34 is supported by a member different from the member that supports the reflector 33 and the mirror 35, so that the position and orientation thereof may be adjusted independently of those of the reflector 33 and the mirror 35.

The reflector 33 and the mirror 35 are both supported by the first support member 36. Therefore, the positions and orientations of the reflector 33 and the mirror 35, which are reflecting units that reflect light before and after the light reaches the reading region R1, with respect to the reading region R1 may be adjusted without changing the positional relationship between the reflecting units. Since it is not necessary to adjust the positional relationship between the reflecting units, positioning of the reflecting units is facilitated.

2. Modification

The above-described exemplary embodiment is merely an example of the present disclosure, and may be modified as described below. The exemplary embodiment and each modification may be realized in combination with each other.

2-1. Reflector

Although the reflecting surface 331 of the reflector 33 for the light to be specularly reflected and the reflecting surface 341 of the reflector 34 for the light to be diffusely reflected are flat in the exemplary embodiment, the reflecting surfaces are not limited to this. For example, the reflecting surface 331 may instead have a shape such that the light emitted from the emission surface 313 of the light guide 312 is reflected so that convergent light is directed toward the document 2 (generally a concave shape).

Convergent light is light that converges toward a predetermined focal point. The focal point may be on the document or at a position in front of or behind the document. The reflecting surface 331 may instead have a shape such that the light emitted from the emission surface 313 of the light guide 312 is reflected so that divergent light is directed toward the document 2 (generally a convex shape). Divergent light is light that spreads instead of converging toward a predetermined focal point. The reflecting surface 341 of the reflector 34 may also be a concave or convex surface.

2-2. Light Emission Unit

The shape of each light emission unit is not limited to that described in the exemplary embodiment. For example, the emission surface of each light emission unit may have a shape other than a rectangular shape. In addition, each light emission unit may have two or more emission surfaces instead of one emission surface. In addition, each light emission unit may have only a light source and have no light guide.

2-3. Reading Device

Although the reading device that reads an image on a document placed on the document table is described in the exemplary embodiment, the reading device is not limited to this. The reading device may be, for example, an inline sensor that reads an image on a paper sheet, which serves as a document, while the paper sheet is being transported.

2-4. Another Interpretation of Partial Functions of Reflector 33 and Mirror 35

The structure for facilitating positioning of the reflecting units that reflect light before and after the light reaches the reading region may be that of a reading device including a first member that causes light to be incident on the document at a reading position; a second member that reflects or receives light that is specularly reflected by the document at the reading position; and a support unit that fixes a relative position and a relative orientation between the first member and the second member.

The structure may be such that light is not caused to be incident at the reading position by any member other than the first member. The reflector 33 according to the above-described exemplary embodiment is also as an example of the first member that causes light to be incident on the reading region R1 of the document 2 by reflecting the light toward the reading region R1 of the document 2. The mirror 35 is also an example of the second member that receives the light specularly reflected by the document 2.

2-4-1. 1× Magnification Optical System

Although the reading device according to the above-described exemplary embodiment includes a reduction optical system, the reading device may instead have a general IX magnification optical system. In such a case, the mirror 35, which is the second reflecting unit having the second reflecting surface that reflects light, may be replaced by a rod lens disposed on an optical path of the specularly reflected light from the reading region R1. In this case, the rod lens serves as an example of the second member.

2-4-2. Incident Light

Figure 11:
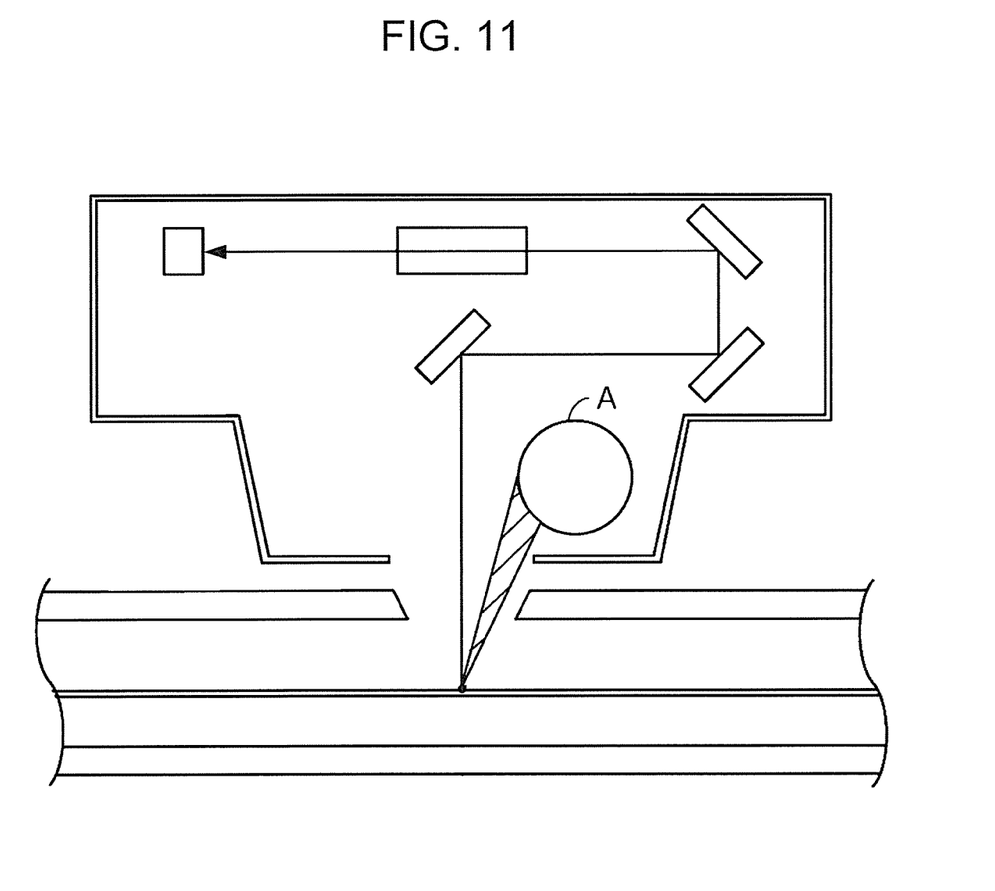
FIG. 11 illustrates an example of a reading device in which light from an emission unit is directly incident at a reading position.

In the above-described exemplary embodiment, the reflector 33 reflects the light from the corresponding emission unit so that the light is caused to be incident at the reading position by the first member and not by any member other. However, as illustrated in FIG. 11, light may instead be caused to be directly incident at the reading position without being reflected. FIG. 11 illustrates an example of a reading device in which light from an emission unit is directly incident at the reading position. In the above-described exemplary embodiment, plural LEDs are arranged in the long-side direction. In contrast, in FIG. 11, a light guide A extends in a long-side direction, and a power LED is provided at an end of the light guide A in the long-side direction. Instead of using the light guide illustrated in FIG. 11, light emitted from plural LEDs arranged in the long-side direction may be directly directed toward the document.

2-5. Output Apparatus

Figure 12:
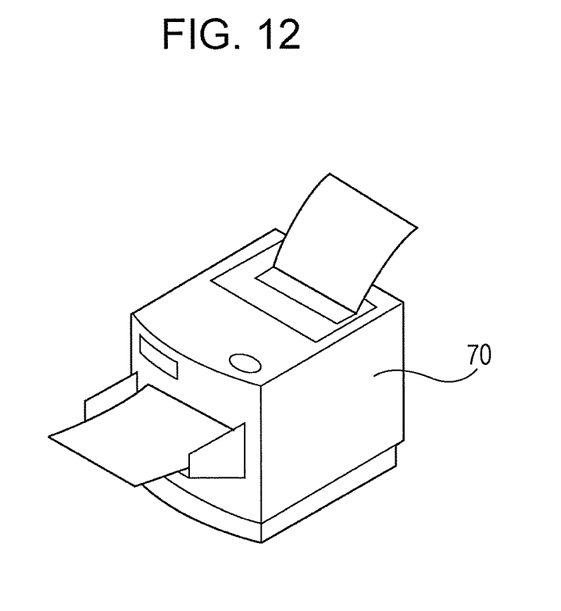
FIG. 12 illustrates an image forming apparatus including the reading device illustrated in FIG. 2.

FIG. 12 illustrates an image forming apparatus 70 including the image reading device 10 illustrated in FIG. 2. The greater the intensity of the specularly reflected light received in the image reading device 10, the higher the glossiness of the document. Accordingly, the level of glossiness at each position of the document may be calculated by, for example, the CPU. The difference between the specularly reflected light and the diffusely reflected light may be used to calculate the level of glossiness. The image forming apparatus 70 forms an image by the inkjet method based on image data reflecting the result of the calculation.

As described above, the image forming apparatus 70 outputs the level of specular reflection, which corresponds to the level of glossiness, based on the specularly reflected light received in the image reading device 10. More specifically, the image forming apparatus 70 outputs an image formed based on the level of specular reflection based on the specularly reflected light received in the image reading device 10. The image forming apparatus 70 is an example of an "output apparatus" according to the present disclosure. Instead of being output by the image forming apparatus 70, the image may be processed based on the level of glossiness and output on a display device, such as a screen of a PC or a tablet.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A reading device comprising:
   an emission unit that emits light;
   a first reflecting unit having a first reflecting surface that reflects the light emitted by the emission unit toward a document;
   an optical path unit including a second reflecting unit having a second reflecting surface that reflects the light reflected by the first reflecting unit and specularly reflected by the document, the optical path unit defining an optical path that guides the light reflected by the second reflecting surface;
   an image sensor that generates an image represented by light guided by the optical path unit; and
   a support unit that supports the first reflecting unit and the second reflecting unit and fixes a relative position and a relative orientation between the first reflecting surface and the second reflecting surface.

2. The reading device according to claim 1, further comprising:
   a second emission unit that emits light and that is disposed such that the light emitted by the second emission unit and diffusely reflected by the document is guided to the image sensor by the optical path unit.

3. The reading device according to claim 2, further comprising:
   a third reflecting unit having a third reflecting surface that reflects the light emitted by the second emission unit toward the document; and
   a second support unit that supports the third reflecting unit.

4. The reading device according to claim 3, wherein the first reflecting unit is disposed closer to the second reflecting unit than the third reflecting unit is.

5. The reading device according to claim 4, wherein each of the first reflecting surface and the second reflecting surface is shaped such that a long-side direction thereof is a main scanning direction, and a dimension of the second reflecting surface in a short-side direction is greater than a dimension of the first reflecting surface in the short-side direction.

6. The reading device according to claim 5, wherein the support unit fixes the first reflecting unit and the second reflecting unit by supporting one end of each of the first reflecting unit and the second reflecting unit in the main scanning direction in a rotatable manner and being in contact with other end of each of the first reflecting unit and the second reflecting unit at two or more positions.

7. The reading device according to claim 4, wherein the support unit fixes the first reflecting unit and the second reflecting unit by supporting one end of each of the first reflecting unit and the second reflecting unit in a main scanning direction in a rotatable manner and being in contact with other end of each of the first reflecting unit and the second reflecting unit at two or more positions.

8. The reading device according to claim 3, wherein each of the first reflecting surface and the second reflecting surface is shaped such that a long-side direction thereof is a main scanning direction, and a dimension of the second reflecting surface in a short-side direction is greater than a dimension of the first reflecting surface in the short-side direction.

9. The reading device according to claim 8, wherein the support unit fixes the first reflecting unit and the second reflecting unit by supporting one end of each of the first reflecting unit and the second reflecting unit in the main scanning direction in a rotatable manner and being in contact with other end of each of the first reflecting unit and the second reflecting unit at two or more positions.

10. The reading device according to claim 3, wherein the support unit fixes the first reflecting unit and the second reflecting unit by supporting one end of each of the first reflecting unit and the second reflecting unit in a main scanning direction in a rotatable manner and being in contact with other end of each of the first reflecting unit and the second reflecting unit at two or more positions.

11. The reading device according to claim 2, wherein each of the first reflecting surface and the second reflecting surface is shaped such that a long-side direction thereof is a main scanning direction, and a dimension of the second reflecting surface in a short-side direction is greater than a dimension of the first reflecting surface in the short-side direction.

12. The reading device according to claim 11, wherein the support unit fixes the first reflecting unit and the second reflecting unit by supporting one end of each of the first reflecting unit and the second reflecting unit in the main scanning direction in a rotatable manner and being in contact with other end of each of the first reflecting unit and the second reflecting unit at two or more positions.

13. The reading device according to claim 2, wherein the support unit fixes the first reflecting unit and the second reflecting unit by supporting one end of each of the first reflecting unit and the second reflecting unit in a main scanning direction in a rotatable manner and being in contact with other end of each of the first reflecting unit and the second reflecting unit at two or more positions.

14. The reading device according to claim 1, wherein each of the first reflecting surface and the second reflecting surface is shaped such that a long-side direction thereof is a main scanning direction, and a dimension of the second reflecting surface in a short-side direction is greater than a dimension of the first reflecting surface in the short-side direction.

15. The reading device according to claim 14, wherein the support unit fixes the first reflecting unit and the second reflecting unit by supporting one end of each of the first reflecting unit and the second reflecting unit in the main scanning direction in a rotatable manner and being in contact with other end of each of the first reflecting unit and the second reflecting unit at two or more positions.

16. The reading device according to claim 1, wherein the support unit fixes the first reflecting unit and the second reflecting unit by supporting one end of each of the first reflecting unit and the second reflecting unit in a main scanning direction in a rotatable manner and being in contact with other end of each of the first reflecting unit and the second reflecting unit at two or more positions.

17. The reading device according to claim 16, wherein the other end is an upstream end in the main scanning direction.

18. An output apparatus comprising:
the reading device according to claim 1,
wherein the output apparatus outputs a level of specular reflection based on specularly reflected light received in the reading device.

19. The output apparatus according to claim 18, wherein the output apparatus is an image forming apparatus that outputs an image formed based on the level of specular reflection based on the specularly reflected light received in the reading device.

20. A reading device comprising:
a first member having a first reflecting surface that causes light to be reflected to and incident on a document at a reading position;
a second member having a second reflecting surface that reflects or receives the light that is reflected by the first member and specularly reflected by the document at the reading position; and
a support unit that fixes a relative position and a relative orientation between the first member and the second member.

* * * * *